United States Patent
Kajiwara et al.

(10) Patent No.: US 11,616,533 B2
(45) Date of Patent: Mar. 28, 2023

(54) RADIO POWER TRANSMISSION SYSTEM AND RADIO POWER TRANSMISSION METHOD

(71) Applicant: Panasonic Corporation, Osaka (JP)

(72) Inventors: Shoichi Kajiwara, Osaka (JP); Hiroyuki Tani, Hyogo (JP); Takuma Ikeda, Osaka (JP); Yuki Tanaka, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 21 days.

(21) Appl. No.: 17/384,969

(22) Filed: Jul. 26, 2021

(65) Prior Publication Data
US 2022/0038137 A1 Feb. 3, 2022

(30) Foreign Application Priority Data

Jul. 28, 2020 (JP) .............................. JP2020-127460

(51) Int. Cl.
*H04B 5/00* (2006.01)
*H02J 50/80* (2016.01)
*H02J 50/40* (2016.01)
*H02J 50/20* (2016.01)

(52) U.S. Cl.
CPC ............ *H04B 5/0037* (2013.01); *H02J 50/20* (2016.02); *H02J 50/40* (2016.02); *H02J 50/80* (2016.02)

(58) Field of Classification Search
CPC ........ H04B 5/0037; H02J 50/80; H02J 50/20; H02J 50/40
See application file for complete search history.

(56) References Cited

U.S. PATENT DOCUMENTS

| 4,075,655 A | * | 2/1978 | Iijima | ..................... G06T 9/004 375/252 |
| 4,691,375 A | * | 9/1987 | McGeehan | .............. H04B 1/68 375/321 |
| RE34,036 E | * | 8/1992 | McGeehan | .............. H04B 1/68 375/321 |
| 6,275,519 B1 | * | 8/2001 | Hendrickson | ......... H04L 7/0054 375/150 |
| 6,606,351 B1 | * | 8/2003 | Dapper | ............... H04L 27/2654 375/E7.002 |

(Continued)

FOREIGN PATENT DOCUMENTS

| DE | 112018006743 T5 | * | 10/2020 | ........... H04B 17/318 |
| DE | 102019125515 A1 | * | 12/2020 | ............. B60Q 9/008 |

(Continued)

*Primary Examiner* — Adam D Houston
(74) *Attorney, Agent, or Firm* — Wenderoth, Lind & Ponack, L.L.P.

(57) ABSTRACT

A radio power transmission system and a radio power transmission method are provided. The radio power transmission system includes a first radio device and a second radio device including a control signal generator and an antenna. The control signal generator generates a control signal for synchronizing frequencies and phases of power waves, based on signals indicating reception intensities of the power waves in a receiving device receiving the power waves. The antenna transmits the control signal to a plurality of the first radio devices. In the radio power transmission system, the plurality of first radio devices radiate, toward the receiving device, the power waves having the frequencies and phases set to a predetermined value based on the control signal.

3 Claims, 5 Drawing Sheets

(56) References Cited

U.S. PATENT DOCUMENTS

| | | | | |
|---|---|---|---|---|
| 9,825,674 B1 * | 11/2017 | Leabman | | H02J 50/80 |
| 11,245,290 B2 * | 2/2022 | Kim | | H04B 5/0037 |
| 11,539,246 B1 * | 12/2022 | Wu | | H02J 50/80 |
| 2002/0034169 A1 * | 3/2002 | Ozluturk | | H04B 1/7085 |
| | | | | 375/E1.006 |
| 2002/0036996 A1 * | 3/2002 | Ozluturk | | H04B 1/7075 |
| | | | | 375/E1.006 |
| 2002/0036998 A1 * | 3/2002 | Lomp | | H04B 1/7075 |
| | | | | 375/E1.006 |
| 2002/0051434 A1 * | 5/2002 | Ozluturk | | H04B 1/70753 |
| | | | | 375/E1.006 |
| 2004/0072575 A1 * | 4/2004 | Young | | G01S 19/48 |
| | | | | 455/427 |
| 2009/0179740 A1 * | 7/2009 | Pillai | | H04B 5/0062 |
| | | | | 340/10.1 |
| 2011/0050166 A1 * | 3/2011 | Cook | | H02J 50/20 |
| | | | | 320/108 |
| 2012/0257701 A1 * | 10/2012 | Ahmed | | H03J 1/005 |
| | | | | 375/374 |
| 2014/0203657 A1 * | 7/2014 | Song | | H02J 50/12 |
| | | | | 307/104 |
| 2016/0099756 A1 * | 4/2016 | Leabman | | H02J 50/80 |
| | | | | 307/104 |
| 2017/0085126 A1 * | 3/2017 | Leabman | | H02J 50/80 |
| 2017/0085127 A1 * | 3/2017 | Leabman | | H02J 50/80 |
| 2022/0045554 A1 * | 2/2022 | Leabman | | H02J 50/40 |
| 2022/0273292 A1 * | 9/2022 | Shelton, IV | | H02J 50/80 |

FOREIGN PATENT DOCUMENTS

| | | | | | |
|---|---|---|---|---|---|
| EP | 3125427 | A1 * | 2/2017 | | H03H 11/16 |
| JP | 2008154222 | A * | 7/2008 | | G06K 19/0701 |
| JP | 6437954 | | 12/2018 | | |
| KR | 20170054362 | A * | 5/2017 | | |
| WO | WO-0193444 | A1 * | 12/2001 | | G01S 13/0209 |
| WO | WO-0193446 | A2 * | 12/2001 | | G01S 13/0209 |
| WO | WO-2013020105 | A2 * | 2/2013 | | G01S 13/84 |
| WO | WO-2014158731 | A1 * | 10/2014 | | H05B 45/10 |
| WO | WO-2019108137 | A1 * | 6/2019 | | H02J 50/20 |
| WO | WO-2022076873 | A1 * | 4/2022 | | |

* cited by examiner

RADIO POWER TRANSMISSION SYSTEM AND RADIO POWER TRANSMISSION METHOD

TECHNICAL FIELD

The present disclosure relates to a radio power transmission system and a radio power transmission method.

BACKGROUND ART

Patent Literature (hereinafter, referred to as "PTL") 1 discloses a radio power transmission system for efficiently transmitting power waves to a receiving device from a transmitter. The radio power transmission system described in PTL 1 includes a plurality of transmitters that radiate power waves, a plurality of receiving devices that transmit the received power amounts of the power waves to the transmitters by radio communication, and a manager that manages the plurality of transmitters.

The manager controls a radiation direction and a phase of each power wave of the plurality of transmitters based on the received power amount in order to increase the received power of the receiving devices.

CITATION LIST

Patent Literature

PTL 1
Japanese Patent No. 6437954

SUMMARY OF INVENTION

Technical Problem

Unfortunately, the related art of PTL 1 requires a manager that manages the plurality of transmitters for radio power transmission other than the devices for radio communication (such as transmitters and receiving devices). The requirement for addition of the device for radio power transmission to the current radio communication system as described above possibly increases the costs of the overall system.

One non-limiting and exemplary embodiment of the present disclosure facilitates providing a radio power transmission system and a radio power transmission method each enabling radio power transmission while suppressing increase in cost.

Solution to Problem

A radio power transmission system according to one embodiment of the present disclosure includes: a plurality of first radio devices radiating power waves; and a second radio device including a control signal generator and an antenna, the control signal generator generating a control signal for synchronizing frequencies and phases of the power waves based on signals indicating reception intensities of the power waves in a receiving device receiving the power waves, the antenna transmitting the control signal to the plurality of first radio devices, in which the plurality of first radio devices radiate, toward the receiving device, the power waves having the frequencies and phases set to a predetermined value based on the control signal.

A radio power transmission method according to one embodiment of the present disclosure includes: generating, by a second radio device that performs radio communication with a plurality of first radio devices, a control signal based on signals indicating reception intensities of power waves in a receiving device, the power waves being radiated from the plurality of first radio devices and being received by the receiving device, the control signal being a signal for synchronizing frequencies and phases of the power waves; transmitting, by the second radio device, the control signal to the plurality of first radio devices through an antenna; and radiating, by the plurality of first radio devices having received the control signal, the power waves having the frequencies and phases set to a predetermined value based on the control signal, toward the receiving device.

Advantageous Effects of Invention

According to an embodiment of the present disclosure, it is possible to build a radio power transmission system and a radio power transmission method each enabling radio power transmission while suppressing increase in cost.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, a preferred embodiment of the present disclosure will be described in detail with reference to the accompanying drawings. Note that components having substantially the same functions are denoted by the same reference signs in the present specification and drawings, and the repetitive descriptions thereof are omitted.

Embodiment 1

<Exemplary Configuration of Radio Power Transmission System 100>

Figure 1:
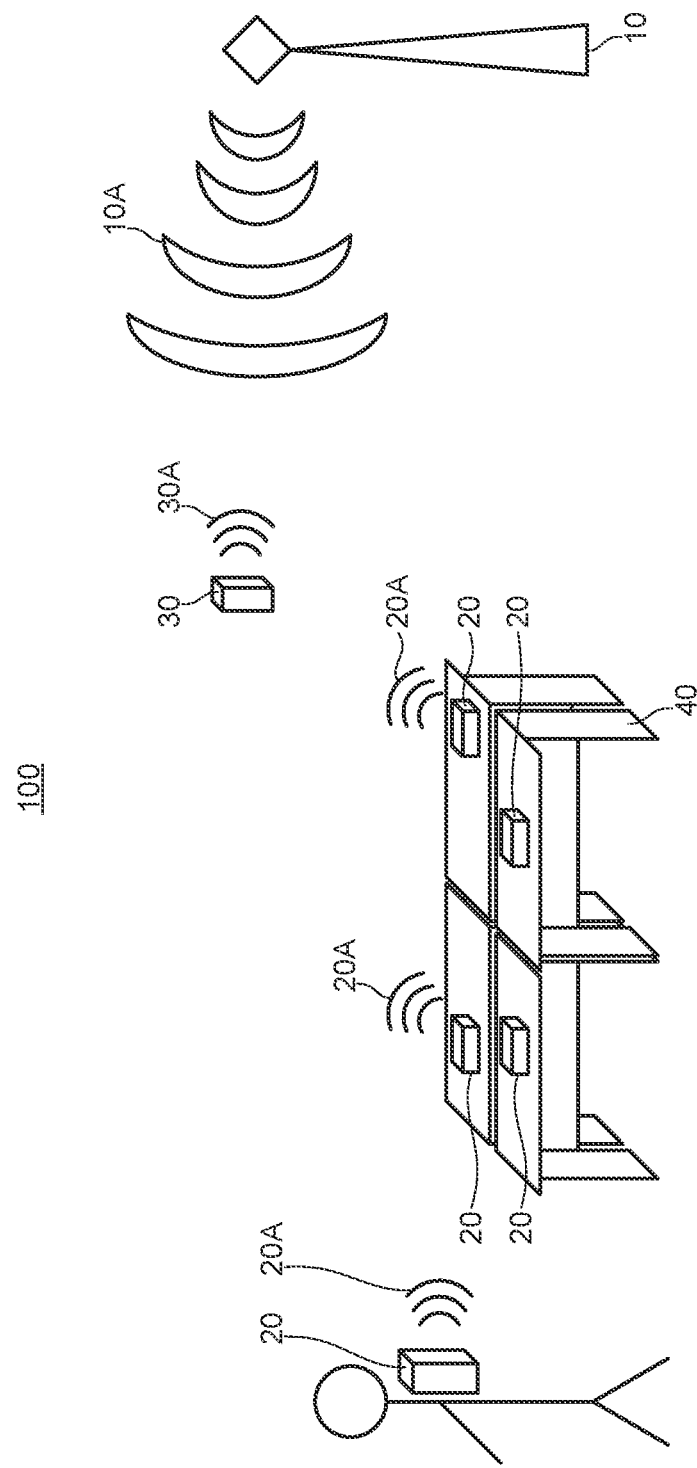
FIG. 1 illustrates an exemplary configuration of radio power transmission system 100 according to Embodiment 1 of the present disclosure.

FIG. 1 illustrates an exemplary configuration of radio power transmission system 100 according to Embodiment 1 of the present disclosure. Radio power transmission system 100 includes radio device 10, a plurality of radio devices 20, and receiving device 30. The plurality of radio devices 20 are installed on desks 40 and/or the like. The plurality of radio devices 20 are each an example of a first radio device in the present embodiment, and radio device 10 is an example of a second radio device in the present embodiment.

<Exemplary Configuration of Radio Device 10>

Figure 2:
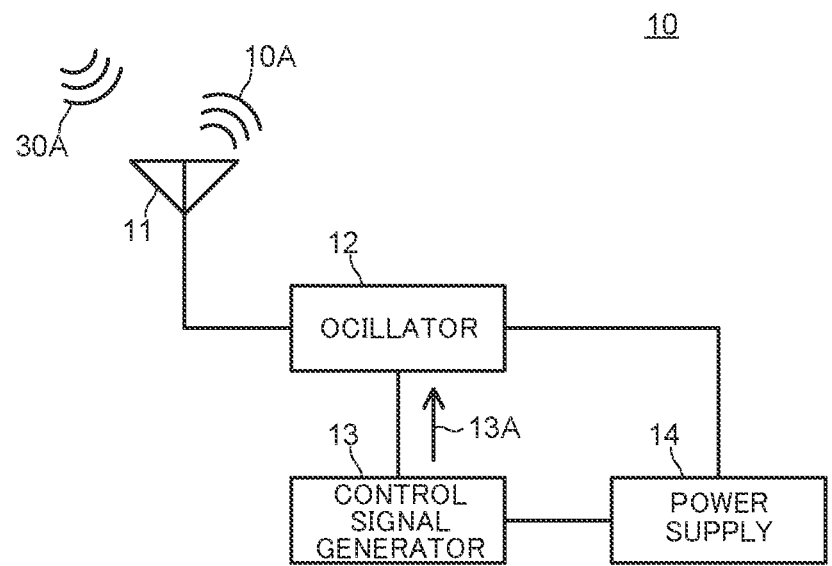
FIG. 2 illustrates an exemplary configuration of radio device 10.

Next, an exemplary configuration of radio device 10 will be described with reference to FIG. 2. FIG. 2 illustrates the exemplary configuration of radio device 10. Radio device 10 includes antenna 11, oscillator 12, control signal generator 13 and power supply 14.

Radio device 10 is, for example, a radio base station for mobile phones supporting a predetermined radio communication standard, a repeater for relaying radio signals, a Wi-Fi (registered trademark) device, a Bluetooth (registered trademark) device, a Bluetooth Low Energy (BLE) device, or a Near Field Communication (NFC) device.

Antenna 11 is a transmitting/receiving antenna that transmits radio wave 10A including control signal 13A toward radio devices 20 and receives intensity signal 30A transmitted from receiving device 30. Control signal 13A will be described in detail later.

Intensity signal 30A is a signal indicating a reception strength (RSSI: Received Signal Strength Indicator) of power wave 20A received by receiving device 30. Power wave 20A may be a continuous wave or a modulated wave (an amplitude-modulated wave or a frequency-modulated wave).

Antenna 11 is, for example, a directional antenna or a nondirectional antenna. A directional antenna is used for long-distance transmission to a specific direction, and the nondirectional antenna is used for short-distance and wide-range transmission.

Oscillator 12 includes, for example, an oscillator circuit and/or an amplifier circuit, and superimposes control signal 13A on a high-frequency signal for enabling radio communication with radio device 20 and transmits these signals to antenna 11. Antenna 11 radiates these signals as radio wave 10A.

Control signal generator 13 includes, for example, a memory, and a Central Processing Unit (CPU), and generates control signal 13A based on intensity signal 30A. Control signal 13A is a signal for controlling a frequency and a phase of power wave 20A radiated from each of the plurality of radio devices to increase the radio field intensity of power wave 20A received by receiving device 30.

Power supply 14 includes, for example, a power conversion circuit for generating direct current power from a commercial alternating current power source, and supplies a power source to operate radio device 10.

<Exemplary Configuration of Radio Device 20>

Figure 3:
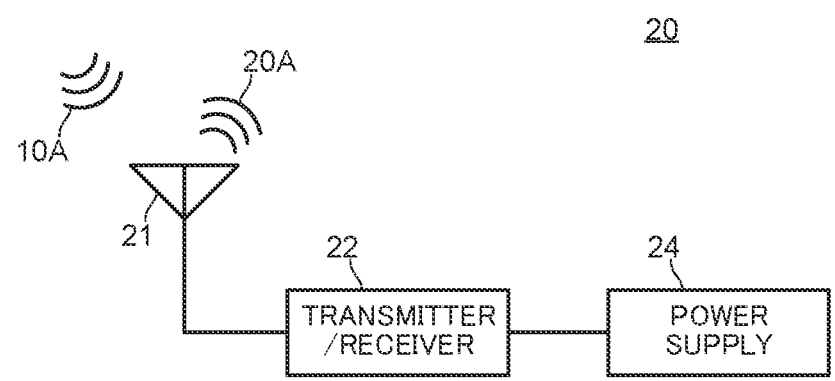
FIG. 3 illustrates an exemplary configuration of radio device 20.

Next, an exemplary configuration of radio device 20 will be described with reference to FIG. 3. FIG. 3 illustrates the exemplary configuration of radio device 20. Radio device 20 includes antenna 21, transmitter/receiver 22 and power supply 24.

Radio device 20 is a cellular phone, a smartphone, a repeater, a Wi-Fi device, a Bluetooth device, or the like supporting a predetermined radio communication standard.

Antenna 21 is a transmitting/receiving antenna for radiating power wave 20A and receiving radio wave 10A.

Transmitter/receiver 22 includes, for example, an oscillator circuit and/or an amplifier circuit, and generates power wave 20A with a synchronized frequency and phase based on control signal 13A included in radio wave 10A and transmits power wave 20A to antenna 21.

When controlling the frequency of power wave 20A, a frequency setting circuit (e.g., a voltage controlled oscillator) included in transmitter/receiver 22 adjusts the oscillation frequency in accordance with the control voltage set by control signal 13A. Thus, the frequencies of power waves 20A radiated respectively from the plurality of radio devices 20 can be matched.

When controlling the phase of power wave 20A, a phase shifter included in transmitter/receiver 22 adjusts the phase of the frequency of power wave 20A based on the time signal transmitted from a Global Positioning System (GPS) satellite. Thus, the phases of power waves 20A radiated from the plurality of radio devices 20 can be matched.

Note that, the phase control method is not limited to the method described above, and for example, an impedance changer formed of a variable capacitor, a variable coil, a variable resistor and/or the like may set the phase by changing the complex impedance connected to antenna 21, in accordance with an impedance setting value included in control signal 13A.

Power supply 24 includes, for example, a power conversion circuit for generating direct current power from a commercial altering current power source, and supplies a power source for operating transmitter/receiver 22.

<Exemplary Configuration of Receiving Device 30>

Figure 4:
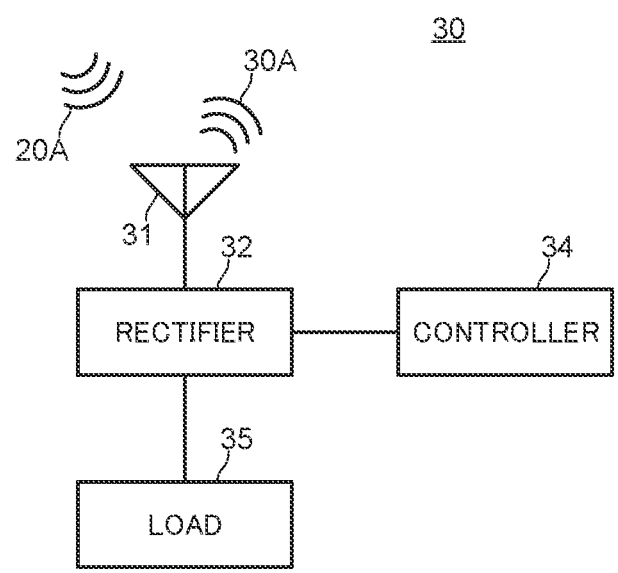
FIG. 4 is an exemplary configuration of receiving device 30.

Next, an exemplary configuration of receiving device 30 will be described with reference to FIG. 4. FIG. 4 illustrates the exemplary configuration of receiving device 30. Receiving device 30 includes antenna 31, rectifier 32, controller 34 and load 35.

Receiving device 30 is a Wi-Fi device, a Bluetooth device, a BLE device, a NFC device or the like supporting a predetermined radio communication standard.

Antenna 31 is a transmitting/receiving antenna for receiving power wave 20A and transmitting intensity signal 30A. Antenna 31 is, for example, a directional antenna or a nondirectional antenna.

Rectifier 32 is formed of a rectifier diode, a filter circuit and/or the like, and converts power wave 20A received by antenna 31 to direct current power.

Controller 34 controls the supply of direct current power to load 35 while generating intensity signal 30A based on the rectified power value, and transmits the generated intensity signal 30A to antenna 31 through rectifier 32.

Load 35 is a sensor such as a thermohygrometer, a barometer, a thermometer and an accelerometer that are used for Internet of Things (IoT), for example.

Figure 5:
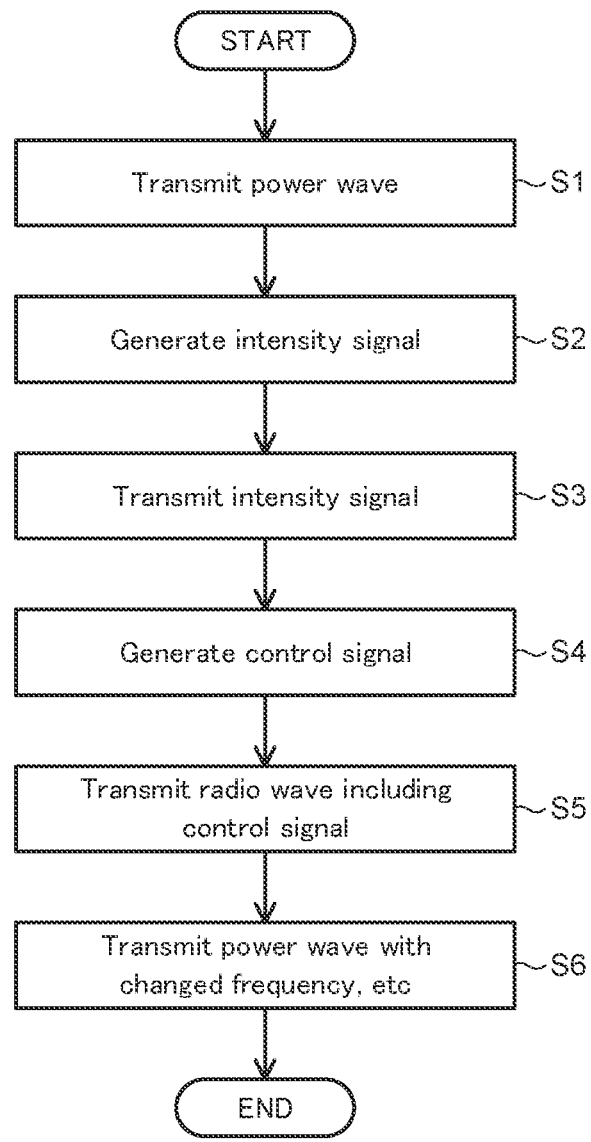
FIG. 5 is a flowchart illustrating an operation of radio power transmission system 100.

Next, the operation of radio power transmission system 100 will be described with reference to FIG. 5. FIG. 5 is a flowchart illustrating the operation of radio power transmission system 100.

When the plurality of radio devices 20 transmits power waves 20A (step S1), receiving device 30 which has received power waves 20A generates intensity signal 30A based on power waves 20A (step S2).

Receiving device 30 transmits intensity signal 30A to radio device 10 (step S3), and radio device 10 which has received intensity signal 30A generates control signal 13A based on intensity signal 30A (step S4).

Radio device 10 superimposes the generated control signal 13A on a high-frequency signal and transmits the signals to a plurality of radio devices 20 as radio wave 10A (step S5). The plurality of radio devices 20 each having received radio wave 10A change the frequency and phase of power wave 20A based on control signal 13A included in radio wave 10A, and transmits the resultant power wave 20A to receiving device 30 (step S6).

Receiving device 30 can receive radio waves with stable strength because receiving device 30 receives a plurality of power waves 20A with matched frequencies and phases, and thus, the plurality of power waves 20A are superimposed.

Note that when the phases and frequencies of the plurality of power waves 20A are different from each other, the radio wave strength in receiving device 30 may decrease because the plurality of power waves 20A received by receiving device 30 weaken each other (cancel out each other).

In contrast, according to radio power transmission system 100 of the present embodiment, the phases and frequencies of the plurality of power waves 20A are matched via transmission of control signal 13A to the plurality of radio devices, and thus, the plurality of power waves 20A received by receiving device 30 strengthen each other. The radio wave strength in receiving device 30, therefore, increases.

Thus, according to radio power transmission system 100 of the present embodiment, it is made possible to increase the radio wave strength in receiving device 30 without adding a dedicated transmitting antenna for transmitting power wave 20A. As a result, it is possible to supply radio power while suppressing increase in cost.

Further, since a dedicated transmitting antenna or the like for transmitting power wave 20A is not required, radio power can be supplied to a wide range compared with the conventional technology, which can transmit radio power only around the location where the transmitting antenna is installed.

Further, since installation of a dedicated transmitting antenna or the like for transmitting power wave 20A is not required in a specific place, supply of radio power is available in any location of the closed space in which a plurality of radio devices 20 are installed (such as a room in a building), for example. That is, the place where the radio power cannot be supplied in a closed space can be reduced.

Therefore, the power required for the operation of receiving device 30 can be secured without changing the position of the dedicated transmission antenna even when a person moves or a desk position is changed in a closed space.

Further, according to radio power transmission system 100 of the present embodiment, even when a plurality of receiving devices 30 are present in a closed space, it is not necessary to adjust the impedance between each of receiving devices 30 and the first radio devices, and thus, the operation time required for impedance adjustment is greatly reduced.

Embodiment 2

Figure 6:
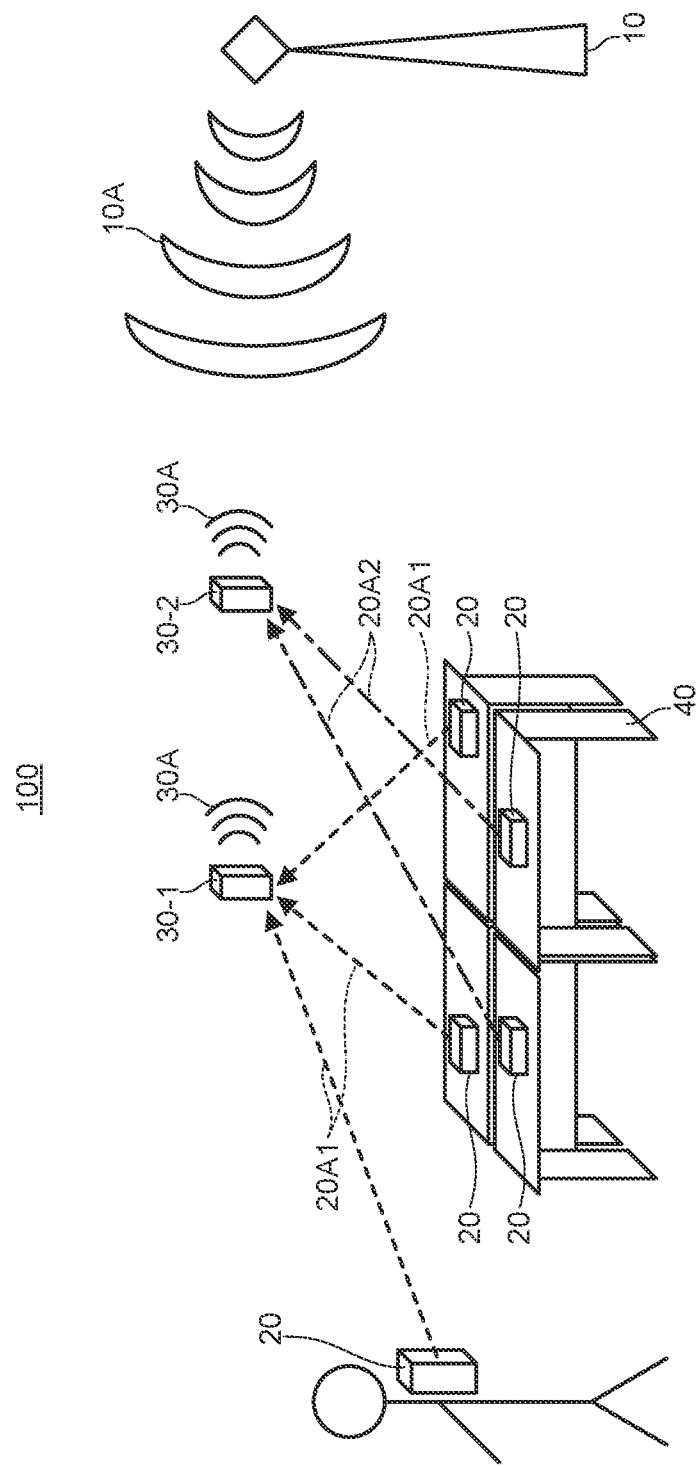
FIG. 6 illustrates an exemplary configuration of radio power transmission system 100 according to Embodiment 2 of the present disclosure.

FIG. 6 illustrates an exemplary configuration of radio power transmission system 100 according to Embodiment 2 of the present disclosure. Radio power transmission system 100 according to Embodiment 2 includes a plurality of receiving devices 30-1 and 30-2 that are configured to receive radio waves of different frequencies, respectively. Hereinafter, the same portions as those in Embodiment 1 are denoted by the same reference numerals, and descriptions thereof will be omitted, and different portions will be described.

Control signal generator 13 of radio device 10 further generates a frequency setting signal for setting a different frequency for a plurality of radio devices 20.

Among the plurality of radio devices 20, a first radio device group formed of two or more radio devices 20 radiates power wave 20A1 with a frequency set to a first value based on the frequency setting signal, toward a first receiving device (receiving device 30-1).

Among the plurality of radio devices 20, a second radio device group formed of two or more radio devices 20 radiates power wave 20A1 with a frequency set to a second value different from the first value based on the frequency setting signal, toward a second receiving device (receiving device 30-2).

For example, consider a case where one radio device 20 in which a transmitting frequency of 1.5 GHz is set and two receiving devices 30 in which a transmitting frequency of 1.5 GHz is set communicate with each other, and radio device 20 outputs power wave 20A of 100 mW. In this case, assuming that the power of power wave 20A reached to each of two receiving devices 30 falls to, for example, one-tenth, the power of power wave 20A received by each of two receiving devices 30 becomes 5 mW (=10 mW/2).

In radio power transmission system 100 of Embodiment 2, radio power is supplied to receiving device 30-1 and receiving device 30-2 with power waves having frequencies different from each other. That is, different radio power frequencies are allocated to receiving device 30-1 and receiving device 30-2, respectively. Also, the number of radio devices 20 allocated to each receiving device 30-1 and 30-2 is greater than when a single radio power frequency is allocated.

For example, consider a case where radio device 20 having a transmission frequency of 1.5 GHz and receiving device 30-1 having a transmission frequency of 1.5 GHz communicate with each other and radio device 20 outputs power wave 20A of 100 mW. In this case, assuming that the power of power wave 20A reached to device 30-1 falls to, for example, one-tenth, the power of power wave 20A received by receiving device 30-1 becomes about 10 mW.

Further, suppose a case where radio device 20 having a transmission frequency of 2.0 GHz and receiving device 30-2 having a transmission frequency of 2.0 GHz communicate with each other and radio device 20 outputs power wave 20A of 100 mW. In this case, assuming that the power of power wave 20A reached to device 30-2 falls to, for example, one-tenth, the power of power wave 20A received at receiving device 30-2 becomes about 10 mW.

Thus, the power can be efficiently supplied to each of receiving devices 30-1 and 30-2 in a single radio power transmission system 100 compared to the case where the radio power transmission by the power wave having a single frequency set is performed. Further, the use of different frequencies enables reducing the fading effect.

Note that, in each of the embodiments described above, the exemplary configuration has been described, in which radio device 10 includes control signal generator 13 and a plurality of radio devices 20 radiate power waves with a frequency and phase set to a predetermined value based on the control signal, toward receiving device 30. However, the embodiments according to the present disclosure are not limited thereto.

For example, one of the plurality of radio devices 20 may be configured to have a control signal generator. In this case, each of the other radio devices 20 may be configured to radiate a power wave having a frequency and phase set to a predetermined value based on the control signal generated by the control signal generator included in the one of radio devices 20, toward receiving device 30, 30-1 or 30-2. Note that, in this case, radio device 20 having the control signal generator corresponds to the second radio device, and the other radio devices 20 correspond to the first radio devices.

Further, receiving device 30, 30-1 or 30-2 may be configured to have a control signal generator. In this case, each of the plurality of radio devices 20 may be configured to radiate the power wave having a frequency and phase set to a predetermined value based on the control signal generated by the control signal generator of receiving device 30, 30-1 or 30-2, toward receiving device 30, 30-1 or 30-2. Note that, in this case, receiving device 30, 30-1 or 30-2 is a receiving device and corresponds to the second radio device, and the plurality of radio devices 20 corresponds to the first radio devices.

Further, a configuration may be adopted, in which receiving device 30, 30-1 or 30-2 includes a control signal generator, and a plurality of radio devices 10 are present. In this case, each of the plurality of radio devices 10 may be configured to radiate the power wave having a frequency and phase set to a predetermined value based on the control signal generated by the control signal generator of receiving device 30, 30-1 or 30-2, toward one or more of the plurality of radio devices 20. Note that, in this case, receiving device 30, 30-1 or 30-2 is a receiving device and corresponds to the second radio device, and the plurality of radio devices 10 corresponds to the first radio devices. Moreover, one or more of the plurality of radio devices 20 correspond to a receiving device.

Note that, it is understood that the following aspects also belong to the technical scope of the present disclosure, for example.

(1) A radio power transmission system according to an embodiment includes: a plurality of first radio devices radiating power waves; and a second radio device including a control signal generator and an antenna, the control signal generator generating a control signal for synchronizing frequencies and phases of the power waves based on signals indicating reception intensities of the power waves in a receiving device receiving the power waves, the antenna transmitting the control signal to the plurality of first radio devices, in which the plurality of first radio devices radiate, toward the receiving device, the power waves having the frequencies and phases set to a predetermined value based on the control signal.

(2) In the radio power transmission system according to the embodiment, the control signal generator further generates a frequency setting signal for setting different frequencies respectively for a first group of the first radio devices among the plurality of first radio devices and a second group of the first radio devices among the plurality of first radio devices, and the first group of the first radio devices radiates the power waves having the frequencies set to a first value based on the frequency setting signal, toward a first receiving device, and the second group of the first radio devices radiates the power waves having the frequencies set to a second value different from the first value based on the frequency setting signal, toward a second receiving device.

(3) A radio power transmission method includes: generating, by a second radio device that performs radio communication with a plurality of first radio devices, a control signal based on signals indicating reception intensities of power waves in a receiving device, the power waves being radiated from the plurality of first radio devices and being received by the receiving device, the control signal being a signal for synchronizing frequencies and phases of the power waves; transmitting, by the second radio device, the control signal to the plurality of first radio devices through an antenna; and radiating, by the plurality of first radio devices having received the control signal, the power waves having the frequencies and phases set to a predetermined value based on the control signal, toward the receiving device.

While various embodiments have been described herein above, it is to be appreciated that various changes in form and detail may be made without departing from the sprit and scope of the invention(s) presently or hereafter claimed.

This application is entitled to and claims the benefit of Japanese Patent Application No. 2020-127460, filed on Jul. 28, 2020, the disclosure of which including the specification, drawings and abstract is incorporated herein by reference in its entirety.

INDUSTRIAL APPLICABILITY

An embodiment of the present disclosure is suitable for a radio power transmission system and a radio power transmission method.

REFERENCE SIGNS LIST

10 Radio device
10A Radio wave
11 Antenna
12 Oscillator
13 Control signal generator
14 Power supply
20 Radio device
21 Antenna
22 Transmitter/receiver
24 Power supply
30 Receiving device
30A Intensity signal
100 Radio power transmission system

The invention claimed is:

1. A radio power transmission system, comprising:
a plurality of first radio devices radiating power waves; and
a second radio device including a control signal generator and an antenna, the control signal generator generating a control signal for synchronizing frequencies and phases of the power waves based on signals indicating reception intensities of the power waves in a receiving device receiving the power waves, the antenna transmitting the control signal to the plurality of first radio devices, wherein
the plurality of first radio devices radiate, toward the receiving device, the power waves having the frequencies and phases set to a predetermined value based on the control signal.

2. The radio power transmission system according to claim 1, wherein
the control signal generator further generates a frequency setting signal for setting different frequencies respectively for a first group of the first radio devices among the plurality of first radio devices and a second group of the first radio devices among the plurality of first radio devices, and wherein
the first group of the first radio devices radiates the power waves having the frequencies set to a first value based on the frequency setting signal, toward a first receiving device, and
the second group of the first radio devices radiates the power waves having the frequencies set to a second value different from the first value based on the frequency setting signal, toward a second receiving device.

3. A radio power transmission method, comprising:
generating, by a second radio device that performs radio communication with a plurality of first radio devices, a control signal based on signals indicating reception intensities of power waves in a receiving device, the power waves being radiated from the plurality of first radio devices and being received by the receiving device, the control signal being a signal for synchronizing frequencies and phases of the power waves;

transmitting, by the second radio device, the control signal to the plurality of first radio devices through an antenna; and radiating, by the plurality of first radio devices having received the control signal, the power waves having the frequencies and phases set to a predetermined value based on the control signal, toward the receiving device.

* * * * *